May 10, 1949.　　　　R. A. PILSNER　　　　2,469,987
ROLLER JACK FOR AUTOMOBILE ROOFS

Filed June 27, 1945　　　　　　　　　　　　　2 Sheets-Sheet 1

INVENTOR
R. A. PILSNER
BY
ATTORNEY

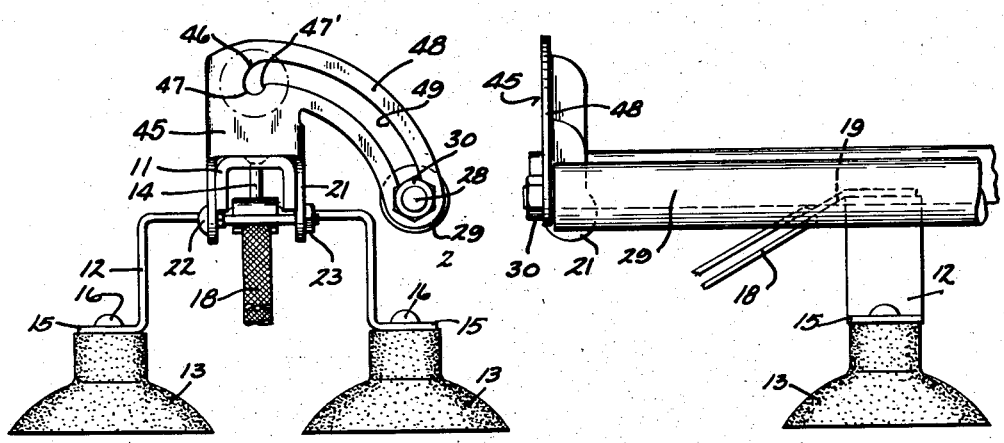
Fig. 4.
Fig. 5.
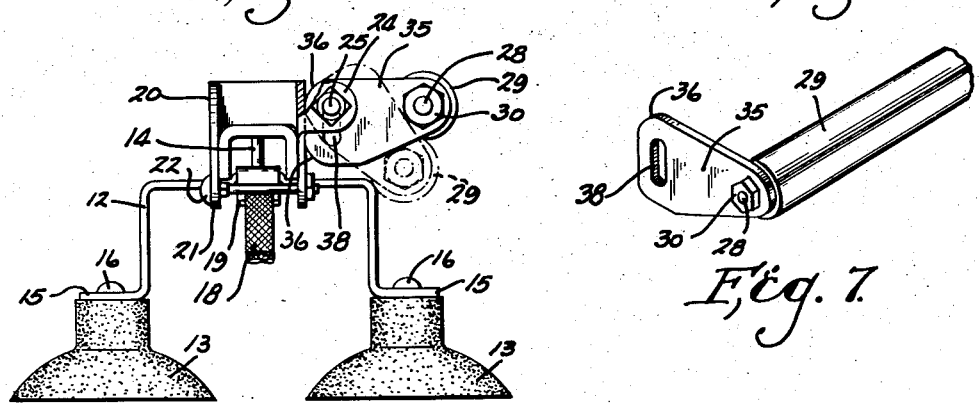
Fig. 6.
Fig. 7.
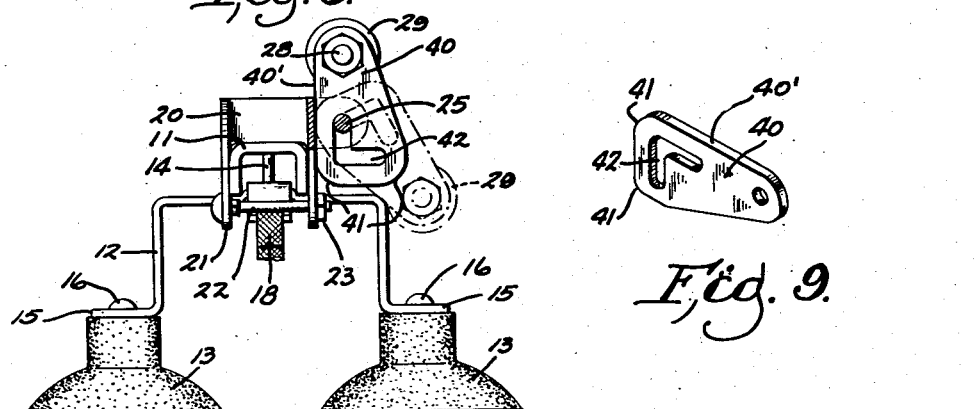
Fig. 8.
Fig. 9.
INVENTOR
R. A. PILSNER
BY W. H. Buckley
ATTORNEY Patented May 10, 1949

2,469,987

UNITED STATES PATENT OFFICE 2,469,987

ROLLER JACK FOR AUTOMOBILE ROOFS

Richard A. Pilsner, Waupun, Wis., assignor to Wesbar Stamping Corporation, West Bend, Wis., a corporation of Wisconsin Application June 27, 1945, Serial No. 601,788

8 Claims. (Cl. 193—42)

This invention relates generally to an improvement in carriers and more particularly to a novel and advantageous loading and unloading device combined with the carrier to facilitate loading and unloading of heavy, bulky and unwieldy objects or articles such as boats or the like. While the present invention is particularly designed and adapted for advantageous organization with the type of carrier adapted to transport such articles on the metal tops of automobiles or the like, it is not necessarily restricted to such use but is capable of various other uses and applications. In other words it may be combined advantageously with either mobile or stationary supports.

With the present invention, one person may load and unload a boat or other heavy, bulky and unwieldy objects or articles and this with ease and facility, and further when the object or article is loaded the device may be readily and easily shifted to an idle, storage position so that the object or article is securely and stably supported on the carrier.

Another object of the invention is to provide a device of this character which is simple, compact and closely organized in construction, rugged, durable and reliable in use, readily and easily operable and susceptible of economical manufacture from materials and by means of facilities readily available.

These objects of the invention and other ancillary advantages are attained by the mechanism, construction, and arrangement illustrated in the accompanying drawings forming part hereof, in which:

Figure 4 is a view in end elevation similar to Figure 2 but showing a different form of loading and unloading device embodying the present invention;

Figure 5 is a fragmentary view in rear elevation of the form of invention shown in Figure 4;

Figure 6 is a view in end elevation similar to Figures 2 and 4 but illustrating another structural variant of the loading and unloading device;

Figure 7 is a fragmentary perspective view showing one of the slotted arms and a portion of the roller journalled thereon in accordance with the showing in Figure 6;

Figure 8 is a view in end elevation similar to Figures 2, 4 and 6 but showing another form of the loading and unloading device embodying the present invention; and Figure 9 is a detail perspective view of one of the slotted arms employed in the form of invention shown in Figure 8.

Figure 1:
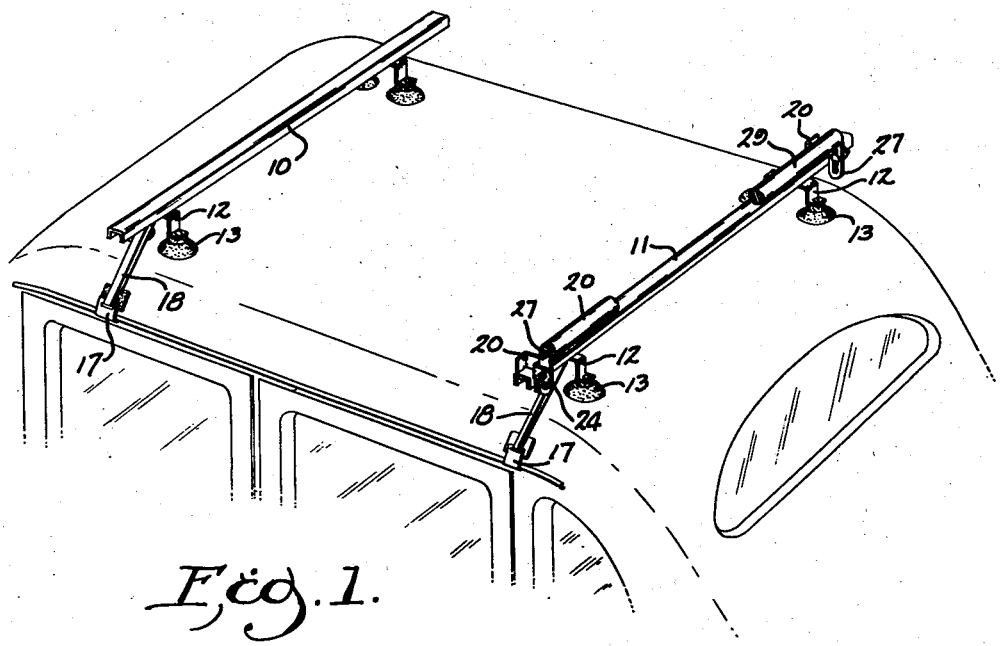
Figure 1 is a fragmentary perspective view showing the present invention combined with a carrier or support of the type adapted for use in transporting articles on the metal tops of automobiles.

Referring to the drawings and more particularly to Figure 1 it will be seen that the present invention is illustrated as combined with that type of support or carrier adapted to be mounted and secured on the metal tops of automobiles or the like. In the construction illustrated the carrier support comprises a front transverse bar 10 and a rear transverse bar 11. These bars may be constituted of any suitable material. They are illustrated as inverted metal channels. They may be supported on and attached to the top of the car in any convenient way. In the embodiments of the invention illustrated they are attached to the top of the car and securely supported thereon by means of inverted U-shaped brackets 12 and suction or vacuum cups 13. The flanges of the transverse bars 10 and 11 rest on the body portions of the brackets 12 and are securely fastened thereto by bolts and nuts 14 (see Figure 3). The legs of the brackets 12 are outturned at their lower ends as at 15 and are securely fastened as at 16 to the necks of the vacuum or suction cups 13. Of course, the support may be otherwise constituted but to constitute it in the manner described is particularly advantageous for transporting heavy, bulky, and unwieldy objects on the tops of automobiles.

To further insure the retention of the transverse bars 10 and 11 in proper position on the car top hook means 17 is provided at each end of each of the transverse bars 11. The hook means is adapted beneath the rain gutters of the automobile and they are connected by adjustable and flexible straps 18 to slotted attaching strips 19 fastened to the bars 10 and 11 by the same bolts 14 that secure the bars 10 and 11 to the brackets 12 (see Figures 1 and 3).

Figures 2, 3:
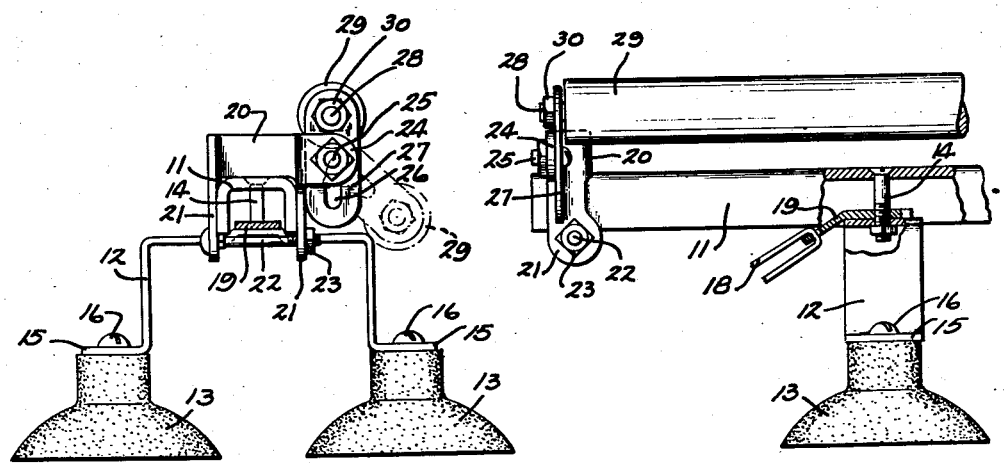
Figure 2 is a view in end elevation showing the rear support and also one embodiment of the loading and unloading device combined with this rear support, the loading and unloading device being shown in full lines in operative position and in dot and dash lines in idle, storage position, a part being broken away and shown in section for simplicity in illustration.
Figure 3 is a fragmentary view in rear elevation further illustrating the structure shown in Figure 2, with parts broken away and shown in section for the sake of illustration.

In the form of the invention illustrated in Figures 2 and 3 the loading and unloading device includes two vertically disposed channel shaped brackets 20, one at each end portion of the rear cross bar 11 and extending upwardly therefrom. As illustrated to advantage in Figures 1 and 3 these end portions project well beyond the brackets 12. The side flanges of the brackets 20 are extended downwardly as at 21 to a point below the side flanges of the rear cross bar 11. The lower end portions of the flange extensions 21 of each bracket 20 have transversely alined openings through which a clamping bolt 22 extends. A nut 23 threaded on the bolt coacts with the head thereof to securely clamp each bracket 20 in place. One of the side flanges of each bracket 20 is provided with a rearwardly extending lug 24. A pivot bolt 25 is carried by a pivot opening in the lug 24 and is held in place by a suitable nut.

Arms 27 are mounted on or interfitted with the pivot bolts 25 for pivotal and sliding movement relative thereto. For this purpose each arm 27 has a somewhat elongated slot 26 extending longitudinally or lengthwise thereof. Each slot 26 is symmetrically disposed with respect to the major axis of its arm and terminates short of or in spaced relation to its ends. The pivots 25 extend through and are interfitted with these slots 26 to provide for the pivotal and sliding movement described.

A roller 29 is supported on the outer ends of the arms 27 for rotation about its own axis in all positions of the arms 27. For this purpose, the outer ends of the arms 27 are provided with transversely alined bearings or bearing openings designed and adapted to receive and rotatably support trunnions or journals 28 provided at the ends of the roller 29. The trunnions or journals 28 project beyond the arms 27 and nuts 30 are threaded on the projecting portions of the trunnions or journal in such manner as not to interfere with free rotation of the roller 29 and yet hold the parts assembled.

With such a construction the roller may be disposed in an idle, storage position at a point below the level of the top surface of the rear transverse bar 11 or it may be swung upwardly to the position shown in Figure 2, and as the roller reaches the vertical position it drops down along with the arm 27 so as to bring the inner side of the arm into engagement with the rearmost side flange of the bracket 20. These parts are hence in an abutting engagement and the roller 29 will be held in operative, that is, loading and unloading position although free to rotate about its own axis and will of course be above the top surface of the rear transverse bar 11. In this position a single person may load or unload a heavy, bulky and unwieldy object on the top of the car. After the boat or other object has been properly loaded its rear end may be lifted and the roller and its arms swung back to idle, storage position. This operation is reversed when it is desired to unload the boat or object from the support or carrier.

The forms of the invention shown in Figures 6, 7, 8 and 9 are very similar in construction and mode of operation to the embodiment shown in Figures 1 to 3. As in the form shown in Figures 1 to 3, the channel shaped brackets 20 having the extensions 21 of their side flanges clamped on the end portions of the rear transverse bar 11 by clamping bolt 22 and nut 23. Each bracket 20 has a rearwardly extending lug 24 carrying pivot bolt 25 as before. In fact, the forms illustrated in Figures 6 and 7 and Figures 8 and 9 differ from each other and from the embodiment shown in Figures 1 to 3 only in the respective slotted formations of their arms corresponding to arms 27 in Figures 1 to 3, and in the shape or marginal formations of such arms.

In the form illustrated in Figures 6 and 7, the arms are designated at 35. They are of tapered formation, with rounded corners 36 at their large or inner ends and have transverse slots 38 interfitted with the pivots 25 for sliding and pivotal movement. A roller 29 is rotatably mounted on the outer ends of the arms 35 in the same way the roller 29 is mounted in Figures 1 to 3. With this form of the invention the arms 35 and roller 29, in the idle, storage position of the loading and unloading device occupy the position shown in dot and dash lines in Figure 6. When raised or shifted to operative, that is, loading and unloading position the arms 35 and roller 29 occupy the full line positions shown in Figure 6 wherein the surface of the roller 29 is above the level of the top surface of the cross bar 11. In the operative position, the inner ends of the arms 35 bear against the abutments presented by the adjacent side flanges of the brackets 20 to releasably secure the arms 35 and roller 29 in operative position.

In the form of the invention illustrated in Figures 8 and 9, the arms are designated at 40. They are of tapered formation, have rounded corners 41 and are provided with L-shaped slots 42 interfitted with the pivots 25 to mount the arms 40 thereon for pivotal and sliding movement. Figure 8 illustrates the operative loading and unloading position of the arms 40 and roller 29 in full lines; the idle or storage position thereof in dotted lines. It is to be understood that the rollers 29 are mounted on the outer ends of the arms 40 in exactly the same manner as this roller is mounted on the arms 29 in the embodiment shown in Figures 1 to 3 and hereinabove more fully described. When the roller 29 and arms 40 are shifted to operative position, the pivots 25 are disposed in the then vertically disposed legs of the L-shaped slots 42 and the straight inner edge or margin $40^1$ of the arms 40 bear against the abutments presented by the adjacent vertical side flanges of the brackets 20 to releasably secure arms 40 and roller 29 in operative position.

The arms 35 in Figure 6 and the arms 40 in Figure 8 and their respective rollers 29 are manipulated or shifted in the same manner and in the same sequence as that described with reference to the arms 27 and roller 29 in Figure 2 to effect loading, unloading and transport.

In all three instances the boat or other object rests flatly on the transverse bars 10 and 11 when the rollers 29 are in idle or storage position and is securely held in place by functional contact with these bars. Auxiliary securing means for holding the boat or other object in place on the bars may be provided if desired but usually this is not necessary. For example, the boat or other object may be tied or strapped to the bars or otherwise releasably secured thereto.

In the form of the invention shown in Figures 4 and 5, the vertically disposed brackets mounted on each end portion of the transverse bar 11 and corresponding to the bracket 20 in the embodiments previously described is designated at 45 as each bracket 45 differs in some respects in construction from corresponding bracket 20. Like each bracket 20, however, each bracket 45 straddles its end portion of the transverse bar 11 and its side flanges have extensions 21 projecting below the flanges of the transverse bar 11 and clamped to the bar 11 by clamping bolt 22 and nut 23.

The body portions or webs of each bracket 45 is provided adjacent its upper ends with an opening 46. The openings 46 of the brackets 45 at the opposite ends of the bar 11 are transversely alined. The lower margins of the openings 46 are formed with notches or depressions 47 providing a bearing surface and abutment designated at 47$^1$.

A curved slotted arm 48 has its upper end integral with or otherwise fixedly secured to the body portion of its bracket 45. The upper end of the slot 49 of each curved arm 48 opens into or communicates with the opening 46 of its bracket 45. Each arm 48 curves rearwardly and downwardly to dispose the lower ends of the slots 49 rearwardly of and below the transverse bar 11. Only one curved slotted arm 45 is illustrated in the drawings but of course there are two of identical construction, one at each end portion of the transverse bar 11. The arms 45 and their slots 49 are parallel to each other and in transverse alinement.

As in the other embodiments of the invention, a roller 29 is provided and has trunnions 28 at its ends interfitted with the slots 49 so that the roller 29 is mounted for rotation about its own axis also for bodily movement in the slots 49 from an idle or storage position in the lower ends of the slots 49 to an operative position in the notches or depressions 47 in the brackets 45. When the trunnions 28 of the roller 29 are disposed in the notches 47 they engage with the bearing surface and abutment 47$^1$ thereof to support the roller for free rotation about its own axis and yet releasably retain it in operative position above the bar 11. It is obvious that the roller 29 in the form shown in Figures 4 and 5 may be manually shifted from idle to operative position and vice versa to provide for loading or unloading and for transport.

While I have shown and described several constructions in which the invention may be advantageously embodied, it is to be understood that the constructions shown have been selected merely for the purpose of illustration or example, and that various changes in the size, shape, and arrangement of the parts may be made without departing from the spirit of the invention or the scope of the subjoined claims.

What I claim is:

1. The combination with a support, of fixed brackets extending vertically above the end portions of the support, a roller, and slotted arms pivotally and slidably interconnected with the brackets and having means at their outer ends for rotatably supporting the ends of the roller whereby the roller may rotate about its own axis and may be shifted from an idle position below the support to an operative loading and unloading position above the support, the brackets presenting abutments against which the slotted arms bear when the roller and slotted arms are swung to operative position above the support and the slotted arms dropped into engagement with said abutments to releasably retain the roller in such position for rotation about its own axis.

2. The combination with a support, of fixed brackets extending vertically above the end portions of the support, a roller, pivots carried by the brackets, arms having longitudinal slots pivotally and slidably interconnected with the pivots of the brackets and having means at their outer ends for rotatably supporting the ends of the roller whereby the roller may rotate about its own axis and may be shifted from an idle position below the support to an operative loading and unloading position above the support, the brackets presenting abutments against which the slotted arms bear when the roller and slotted arms are swung to operative position above the support and the slotted arms dropped into engagement with said abutments to releasably retain the roller in such position for rotation about its own axis.

3. The combination with a support, of fixed brackets extending vertically above the end portions of the support, a roller, pivots carried by the brackets, tapered arms having rounded corners at their large ends and having transverse slots pivotally and slidably interconnected with the pivots of the brackets and having means at their outer ends for rotatably supporting the ends of the roller whereby the roller may rotate about its own axis and may be shifted from an idle position below the support to an operative loading and unloading position above the support, the brackets presenting abutments against which the slotted arms bear when the roller and slotted arms are swung to operative position above the support and the slotted arms dropped into engagement with said abutments to releasably retain the roller in such position for rotation about its own axis.

4. The combination with a support, of fixed brackets extending vertically above the end portions of the support, a roller, pivots carried by the brackets, arms having L-shaped slots pivotally and slidably interconnected with the pivots of the brackets and having bearing openings at their outer ends in which the ends of the roller are journalled whereby the roller may rotate about its own axis and may be shifted from an idle position below the support to an operative loading and unloading position above the support, the brackets presenting abutments against which the slotted arms bear when the roller and slotted arms are swung to operative position above the support and the slotted arms dropped into engagement with said abutments to releasably retain the roller in such position for rotation about its own axis.

5. A carrier for use in transporting boats or other articles on the metal tops of automobiles and comprising front and rear transverse bars extending across the car top and adapted to have supporting engagement with the article carried, means supporting the bars above and securing them to the car top, brackets secured to the end portions of the rear transverse bar and extending upwardly therefrom, pivots on said brackets, arms having slots pivotally and slidably interfitted with the pivots of the brackets, and a roller rotatably supported on the outer ends of the arms for rotation about its own axis.

6. The combination with a support, of fixed brackets extending above the end portions of the support, pivots carried by the brackets, slotted arms having their slots pivotally and slidably interfitted with the pivots of the brackets and a roller having its ends rotatably supported on said arms.

7. The combination with a support, of fixed brackets extending above the end portions of the support, pivots carried by the brackets, slotted arms having their slots pivotally and slidably interfitted with the pivots of the brackets and a roller having its ends rotatably supported on said arms, there being abutments associated with the brackets and engageable with the arms when the roller and slotted arms are swung upwardly and the slotted arms dropped downwardly with respect to the pivots to releasably retain the roller in an operative loading and unloading position above the level of the bar.

8. In an object loading and supporting structure, an elongated transverse support, an arm having an elongated slot, a roller connected to said arm, connecting means including a pivot member extending through the slot of the arm for movably connecting the arm to said support, and an abutment surface so positioned with respect to said pivot and arm as to cooperate with a portion of the arm to releasably maintain the arm and roller carried thereby in an operative position on said pivot.

RICHARD A. PILSNER.

REFERENCES CITED

The following references are of record in the file of this patent:

UNITED STATES PATENTS

| Number | Name | Date |
|---|---|---|
| 1,105,631 | Drain | Aug. 4, 1914 |
| 1,439,257 | Ogren | Dec. 19, 1922 |
| 1,519,416 | Ogren | Dec. 16, 1924 |
| 2,325,762 | Ford | Aug. 3, 1943 |